May 11, 1926. 1,584,083

P. EISENBACH

SPRING WHEEL

Filed April 17, 1925 2 Sheets-Sheet 1

INVENTOR.
Peter Eisenbach
BY
Stuart C Barnes
ATTORNEY.

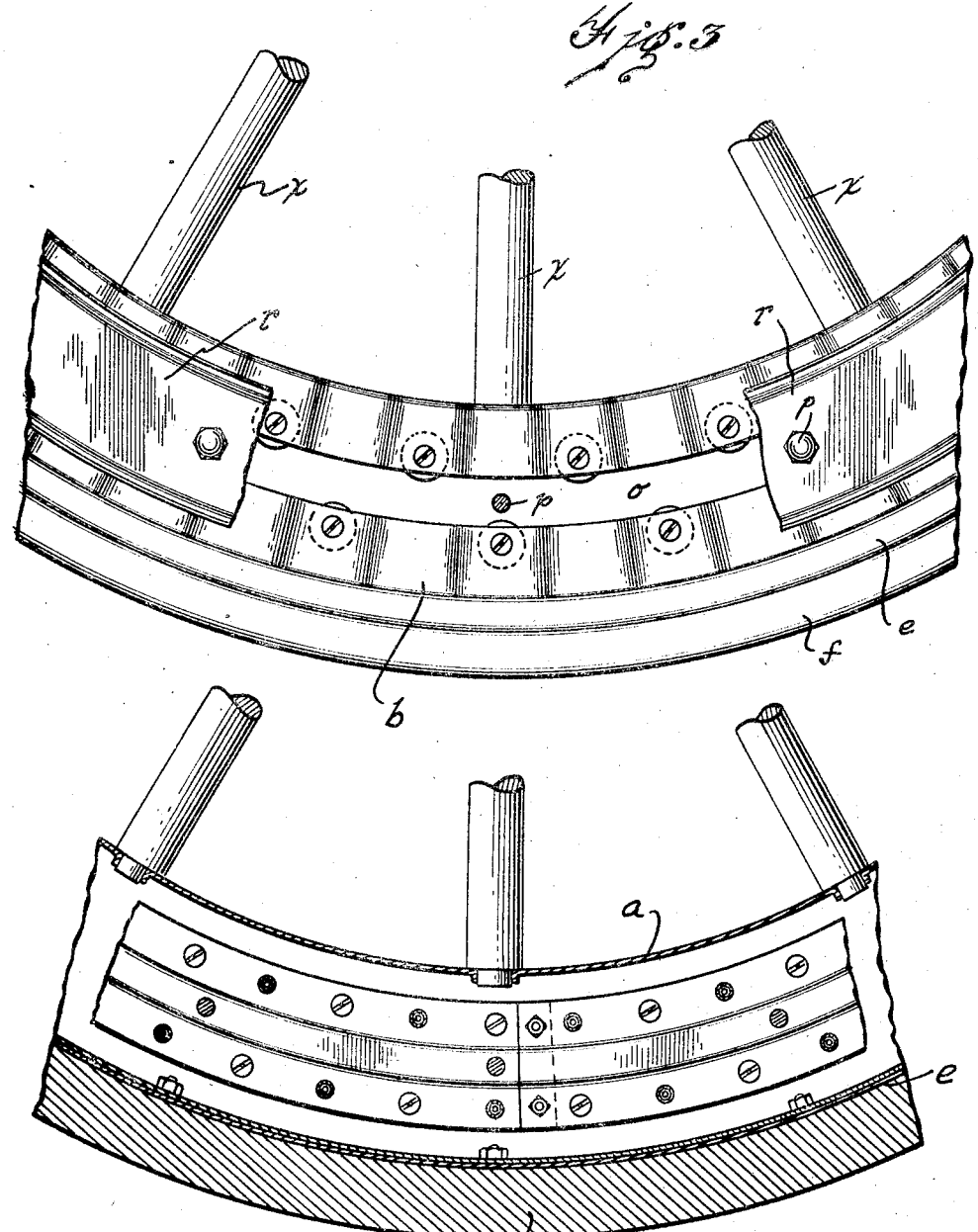

Patented May 11, 1926.

1,584,083

UNITED STATES PATENT OFFICE.

PETER EISENBACH, OF DETROIT, MICHIGAN.

SPRING WHEEL.

Application filed April 17, 1925. Serial No. 23,848.

This invention relates to spring wheels, and has for its object the construction of a more efficient and resilient wheel than is possible with the constructions now on the market.

With this construction I have provided an increased number of resilient compression units and when the load is carried by the wheel a larger number of compressed units come into play, thereby giving a softer riding action, such as is obtained in the new type of "balloon" tires.

Another feature of this invention is the assembly of the compression units which lend themselves to more easy assembly and a more practical construction.

In the drawings:

Fig. 3 is a partial elevation of the wheel with parts broken away.

Fig. 4 is a section on the line 4—4 of Fig. 1.

This wheel is composed of an inner wheel section $a$, provided with a pair of side flanges $b$ and an outer wheel section $c$ provided with the side flanges $d$. Bolted or otherwise secured to the outer wheel section is a tire rim $e$, which carries the solid resilient tire $f$. The spokes $x$ are secured to the inner wheel section and are mounted to the hub (not shown) in the usual manner.

The compression spring units $g$ are constructed in a manner as shown in my copending application Serial No. 737,747, filed September 15th, 1924. In these spring units $g$ the coil springs are held between the flanged retaining cup-shaped end members $h$. Hooked into these end members are the tripodal connecting members $i$, which are each provided with the ball $j$ on the end, which is adapted to seat in the socket $k$ carried by the retaining fixture $m$, which is in turn supported in the side flanges $d$ and $b$. The other ends of the compression units are each supported in the retaining fixture $n$, which is journaled in the full floating ring $o$, located between the outer and inner wheel sections and positioned centrally thereof with respect to the side flanges. These compression units are here shown as positioned in staggered relation with each other. The other ends of the compression units are universally supported as described in the side flanges of the outer and inner wheel sections. I have shown two concentric series of the compression units, the outer units being universally supported in the outer wheel section and the inner series being universally supported in the inner wheel section.

The floating ring, which may be made in two sections, carries the long bolt $p$, which is engaged through the pair of side dust cover rings $r$ and when the nut is screwed down on the bolt, these dust covers are pressed against the outside of the side flanges of the wheel sections and effectively seal the interior of the wheel from any dust or foreign matter which would otherwise enter and clog up the resilient compression units.

Figure 1:
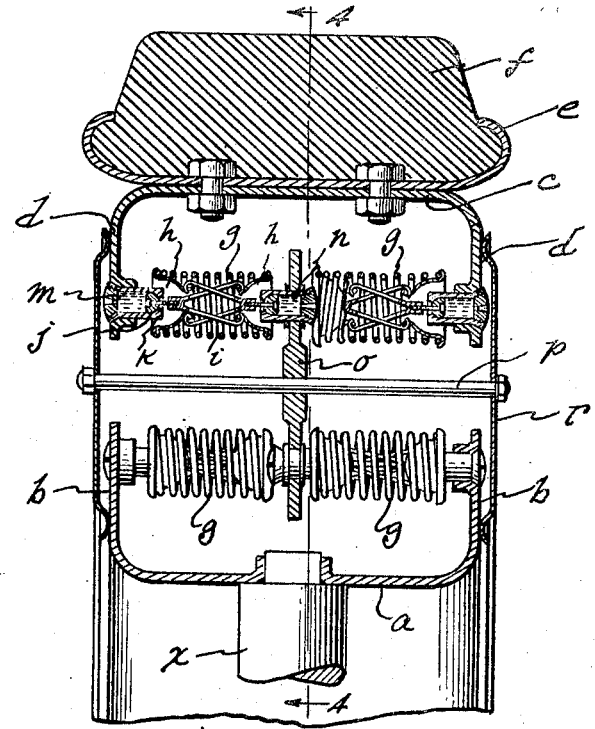
Fig. 1 is a sectional view through a spring wheel embodying my invention.
Figure 2:
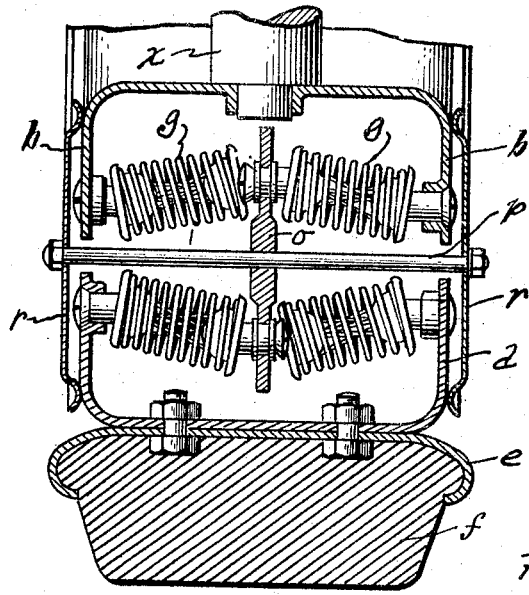
Fig. 2 is a similar section but showing the compression units under compression when carrying a load.

In Fig. 2 I show the action of this wheel when under load. The two wheel sections tend to draw towards each other at the bottom of the wheel when under load, thus compressing the springs, all the springs taking an equal amount of the load.

With this arrangement of springs I am able to use lighter weight spring elements and obtain a more resilient operation than would be possible by using one relatively stiff spring element and yet my plurality of lighter weight springs are equally as strong, if not stronger, than the one spring element. This arrangement has the further advantage that if one of these springs should break it would not detract so much from the mechanical efficiency of the wheel as if one of the heavier type of springs should break. It is preferable that a like number of compression units should be located on each side of the floating ring, $o$.

The essential feature of the invention is that the compression spring units should connect the floating ring with the side flanges to yieldingly resist relative movement between the wheel sections.

What I claim is:

1. In a spring wheel, the combination of an inner wheel section provided with side flanges, an outer wheel section provided with side flanges, a floating ring located between the said wheel sections, and compression spring units for connecting the floating ring with said side flanges and yieldably resisting relative movement of said wheel sections.

2. In a spring wheel, the combination of inner and outer wheel sections each provided with a pair of side flanges which form channel sections opening towards each other, a floating ring centrally positioned with respect to said channel sections, and compression spring units for connecting the floating ring with said side flanges and yieldably resisting relative movement of said wheel sections.

3. In a spring wheel, the combination of inner and outer wheel sections each provided with a pair of side flanges which form channel sections opening towards each other, a floating ring centrally positioned with respect to said channel sections and side sealing rings carried thereby, and compression spring units connecting the floating ring with the side flanges carried by said wheel sections on both sides of the floating ring, said compression spring units yieldably resisting relative movement of said wheel sections.

4. In a spring wheel, the combination of inner and outer wheel sections each provided with side flanges, a floating ring located between said wheel sections, compression spring units for connecting the floating ring with said side flanges and yieldably resisting relative movement of said wheel sections, dust cover rings for closing the gap between the wheel sections, and means carried by said floating ring for supporting said dust cover rings, but which permit relative movement of said wheel sections with respect to said dust cover rings.

In testimony whereof I have affixed my signature.

PETER EISENBACH.